United States Patent
Hsieh

(10) Patent No.: US 8,064,709 B2
(45) Date of Patent: Nov. 22, 2011

(54) METHOD AND APPARATUS FOR BUFFERING OUTPUT PIXEL DATA OF A JOINT PHOTOGRAPHIC EXPERTS GROUP IMAGE

(75) Inventor: Bing-Feng Hsieh, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 925 days.

(21) Appl. No.: 12/045,721

(22) Filed: Mar. 11, 2008

(65) Prior Publication Data

US 2008/0226180 A1    Sep. 18, 2008

(30) Foreign Application Priority Data

Mar. 15, 2007  (TW) .............................. 96108885 A

(51) Int. Cl.
*G06K 9/36*     (2006.01)
(52) U.S. Cl. ...................................................... 382/232
(58) Field of Classification Search .......... 382/232–251, 382/305, 264, 166; 375/240.01–240.29
See application file for complete search history.

(56) References Cited

U.S. PATENT DOCUMENTS

| | | | | |
|---|---|---|---|---|
| 6,671,418 B2 * | 12/2003 | Rengakuji et al. | ............ | 382/264 |
| 7,421,130 B2 * | 9/2008 | Jeffrey et al. | ................. | 382/232 |
| 7,469,067 B2 * | 12/2008 | Kaithakapuzha | ............. | 382/233 |
| 7,720,311 B1 * | 5/2010 | Sriram | .......................... | 382/299 |
| 7,899,275 B2 * | 3/2011 | Ishikawa et al. | .............. | 382/305 |

* cited by examiner

*Primary Examiner* — Ishrat I Sherali
(74) *Attorney, Agent, or Firm* — Thomas|Kayden

(57) ABSTRACT

The invention provides a method for buffering output pixel data of a Joint Photographic Experts Group (JPEG) image. First, a storing rule is determined for storing a scaled minimum coded unit (MCU) of the JPEG image in a memory module, wherein the scaled MCU comprises a plurality of pixels. A memory is then selected from the memory module according to the storing rule for storing pixels of the scaled MCU. Finally, the pixels of the scaled MCU are then output from the memory module to a frame buffer.

22 Claims, 8 Drawing Sheets

| First memeory selection rule | |
|---|---|
| Current memory | Next memory |
| Fisrt memory | Third memory |
| Second memory | Fisrt memory |
| Third memory | Second memory |

FIG. 6A

| Second memeory selection rule | |
|---|---|
| Current memory | Next memory |
| Fisrt memory | Second memory |
| Second memory | Third memory |
| Third memory | Fisrt memory |

FIG. 6B

METHOD AND APPARATUS FOR BUFFERING OUTPUT PIXEL DATA OF A JOINT PHOTOGRAPHIC EXPERTS GROUP IMAGE

BACKGROUND OF THE INVENTION

1. Field of the Invention

The invention relates to Joint Photographic Experts Group (JPEG) images, and more particularly to processing of JPEG images.

2. Description of the Related Art

Joint Photographic Experts Group (JPEG) is a standard established by the International Standards Organization (ISO) and International Telephone and Telegraph Consultative Committee (CCITT) for image compression. The JPEG standard comprises multiple formats including 420, 422V, 411, 422H, and 444. Because JPEG is a standard for storing compressed image, a JPEG image must be decoded to recover the original image before it is shown on a screen.

Regardless of which JPEG format a JPEG image belongs to, a JPEG image is decoded with a minimum coded unit (MCU). An MCU comprises a plurality of pixel blocks, wherein each pixel block comprises 8×8 pixels. The pixels are divided into intensity pixels and color pixels, wherein intensity pixels represent intensities and color pixels represent colors. Pixel blocks therefore are categorized as intensity pixel blocks and color pixel blocks.

FIG. 1A shows an MCU of JPEG images with 420 or 422V format. JPEG image 100 with 420 format comprises intensity pixels 102, blue color pixels 104, and red color pixels 106. An MCU of the JPEG image 100 comprises six pixel blocks 112~117, wherein four are intensity pixel blocks Y0~Y3 and two are color pixel blocks Cb and Cr. JPEG image 120 with 422V format comprises intensity pixels 122, blue color pixels 124, and red color pixels 126. An MCU of the JPEG image 120 comprises four pixel blocks 132~135, wherein two are intensity pixel blocks Y0 and Y2 and the other two are color pixel blocks Cb and Cr.

FIG. 1B shows an MCU of JPEG images with 411, 422H, or 444 format. A JPEG image 140 with 411 format comprises intensity pixels 142, blue color pixels 144, and red color pixels 146. An MCU of the JPEG image 140 comprises six pixel blocks 152~157, wherein four are intensity pixel blocks marked with Y0, Y1 and two are color pixel blocks Cb and Cr. Accordingly, a JPEG image 160 with 422H format comprises intensity pixels 162, blue color pixels 164, and red color pixels 166. An MCU of the JPEG image 160 comprises four pixel blocks 172~175, wherein two are intensity pixel blocks Y0 and Y1 and the other two are color pixel blocks Cb and Cr. Additionally, a JPEG image 180 with 444 format comprises intensity pixels 182, blue color pixels 184, and red color pixels 186. An MCU of the JPEG image 180 comprises three pixel blocks 192~194, including an intensity pixel block Y0 and two color pixel blocks Cb and Cr.

After a JPEG image is decoded to recover an original image, the original image must be scaled in advance to lower the number of pixels to a level suitable for screen display, because size of the original image does not always fit the size of a frame buffer for a screen showing the image. The scaled image is stored in a buffer module. After the frame buffer sends a request to the buffer module, the pixels of the scaled image are then output to the frame buffer.

The buffer module outputs the scaled image in either a 1-byte single write mode, an 8-byte burst write mode, or a 16-byte burst write mode. For the 1-byte single write mode, the buffer module outputs only one byte pixel data to the frame buffer in response to one request. For the 8-byte burst write mode, the buffer module outputs eight bytes of pixel data to the frame buffer in response to one request. For the 16-byte single write mode, the buffer module outputs 16 bytes of pixel data to the frame buffer in response to one request. When the amount of pixel data is large, the buffer module must adopt the 8-byte single write mode or 16-byte single write mode to output pixel data.

A conventional buffer module must have a few Mega bytes of capacity for storing pixel data to be shown on a screen. When buffer capacity increases, manufacturing cost of the buffer also increases. If a smaller buffer capacity module is used, the manufacturing cost of the buffer module is reduced. Therefore, a buffer module with high data output speed and limited capacity is required.

BRIEF SUMMARY OF THE INVENTION

The invention provides a method for buffering output pixel data of a Joint Photographic Experts Group (JPEG) image. First, a storing rule is determined for storing a scaled minimum coded unit (MCU) of the JPEG image in a memory module, wherein the scaled MCU comprises a plurality of pixels. A memory is then selected from the memory module according to the storing rule for storing pixels of the scaled MCU. Finally, the pixels of the scaled MCU are then output from the memory module to a frame buffer.

The invention provides an apparatus for buffering output pixel data of a Joint Photographic Experts Group (JPEG) image. In one embodiment, the apparatus comprises a memory access control module, a memory module, and an output module. The memory access control module receives a minimum coded unit (MCU) of the JPEG image and determines a storing rule for storing the scaled MCU in a memory module, wherein the scaled MCU comprises a plurality of pixels. The memory module selects a memory from the memory module according to the storing rule for storing pixels of the scaled MCU. The output module outputs the pixels of the scaled MCU from the memory module to a frame buffer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 6A shows a first memory selection rule;

FIG. 6B shows a second memory selection rule;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
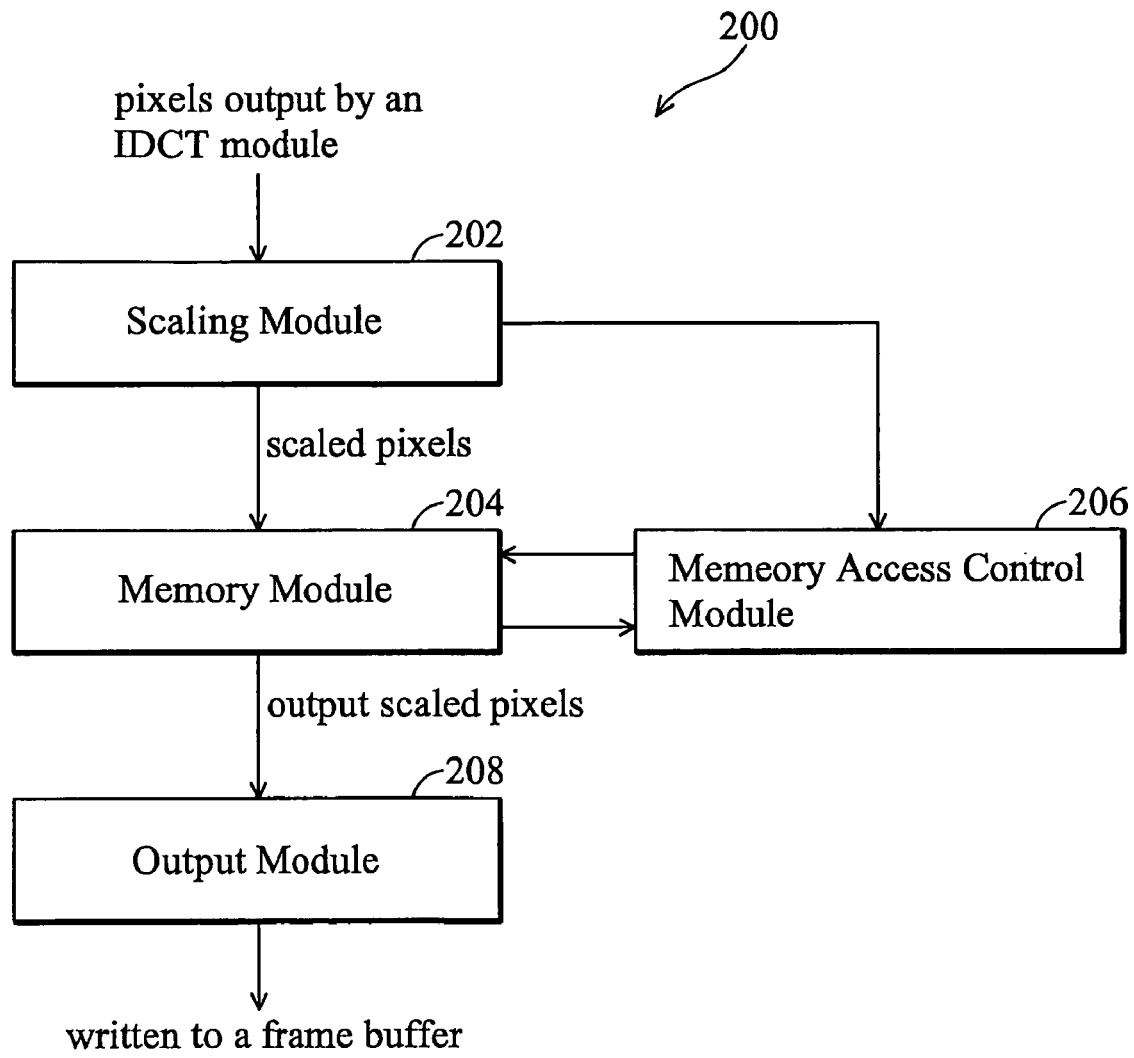
FIG. 2 is a block diagram of an apparatus for buffering output pixel data of a JPEG image according to the invention.

Referring to FIG. 2, a block diagram of an apparatus 200 for buffering output pixel data of a JPEG image according to the invention is shown. The apparatus 200 comprises a scaling module 202, a memory module 204, a memory access control module 206, and an output module 208. The apparatus 200 can buffer pixel data generated by an Inverse Discrete Cosine Transformation (IDCT) module with a limited buffer capacity and output the pixel data to a frame buffer of a screen. The memory module 204 of the apparatus 200 comprises six memories including a first memory to a sixth memory. Each memory stores a pixel block including 8×8 pixels, and each memory therefore has a capacity of 64 bytes. The memory module 204 has a limited capacity of 384 bytes for buffering the pixel data of a JPEG image.

Figure 3:
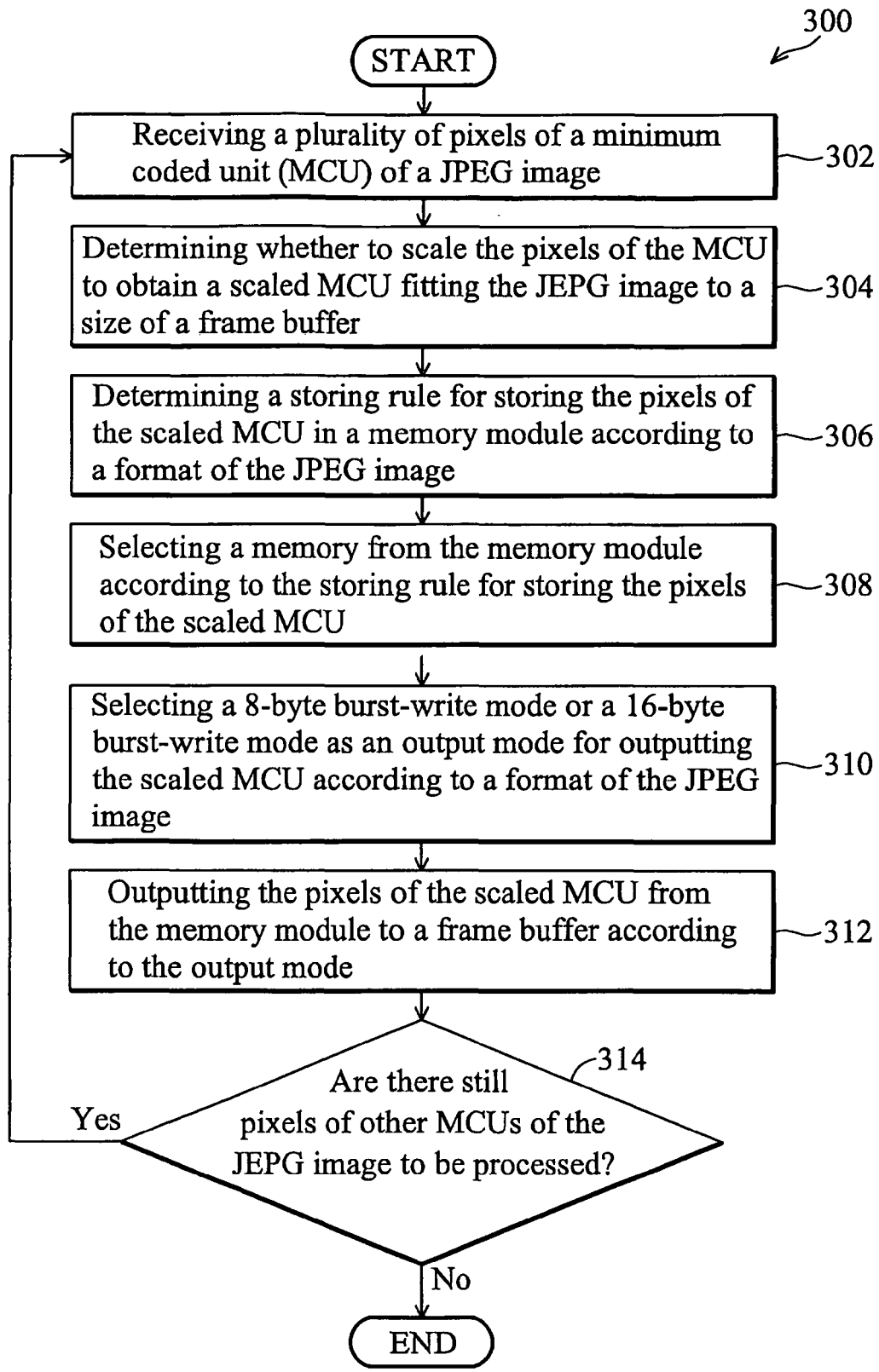
FIG. 3 is a flowchart of a method for buffering output pixel data of a JPEG image according to the invention.

Referring to FIG. 3, a flowchart of a method 300 for buffering output pixel data of a JPEG image according to the invention is shown. Because a JPEG image must be scaled to a size suitable for storing in a frame buffer of a screen before it is displayed on a screen, the scaling module 202 first receives pixels of a Minimum Coded Unit (MCU) of the JPEG image (step 302), and determines whether to scale the pixels of the MCU to allow the size of the JPEG image to fit the size of the frame buffer (step 304). If scaling is required, the MCU of the JPEG image is scaled to obtain a scaled MCU.

The scaled MCU is then delivered to the memory module 204 for storage. The first memory to the third memory of the memory module 204 store intensity pixels of the scaled MCU, and the fourth memory to the fifth memory of the memory module 204 store color pixels of the scaled MCU. If the scaling ratio of the scaled MCU is 1:1 or the MCU is not scaled by the scaling module 202, the MCU is stored in the memory module 204. Because the memory module 204 has a capacity of 384 bytes, the memory access control module 206 must appropriately arrange where pixels of the scaled MCU should be stored in the memory module 204. The memory access control module 206 first determines a storing rule for storing the pixel data in the memory module 202 (step 306). The memory module 202 can then select a memory thereof for storing input pixels according to the storing rule (step 308). Details of the storing rule are further explained with reference to FIGS. 5, 6, and 7A~7C.

The output module 208 then retrieves pixel data from the memory module 204 and delivers the pixel data to a frame buffer of a screen for displaying the JPEG image. The output module 208 first selects an output mode from an 8-byte burst write mode and a 16-byte burst write mode (step 310), and then outputs the pixel data from the memory module 204 to the frame buffer according to the output mode (step 312). Details concerning selection of the output mode are further explained with reference to FIG. 4. The steps 302 to 312 are repeated until all pixel data of the JPEG image is completely output to the frame buffer.

Figure 1A:
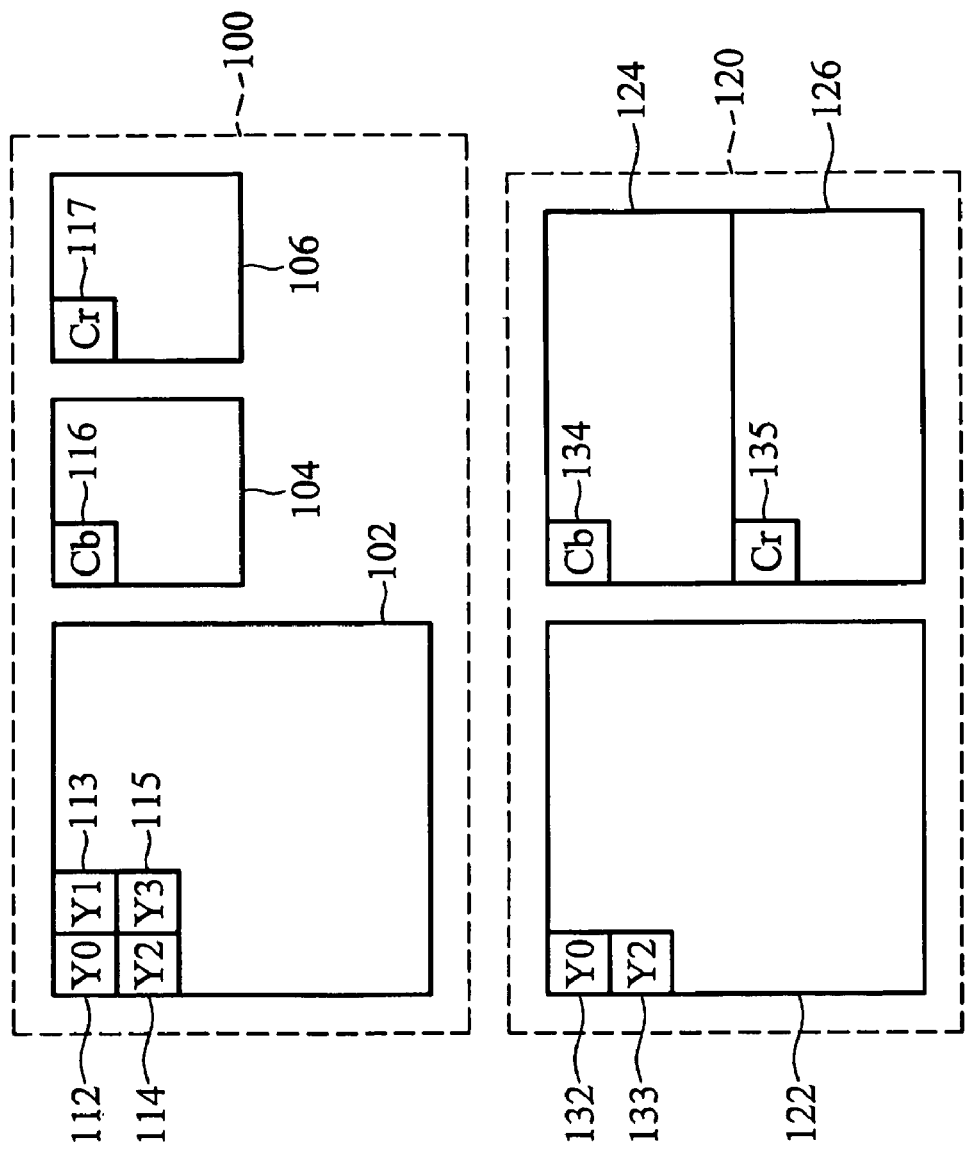
FIG. 1A shows an MCU of JPEG images with 420V or 422V format.
Figure 1B:
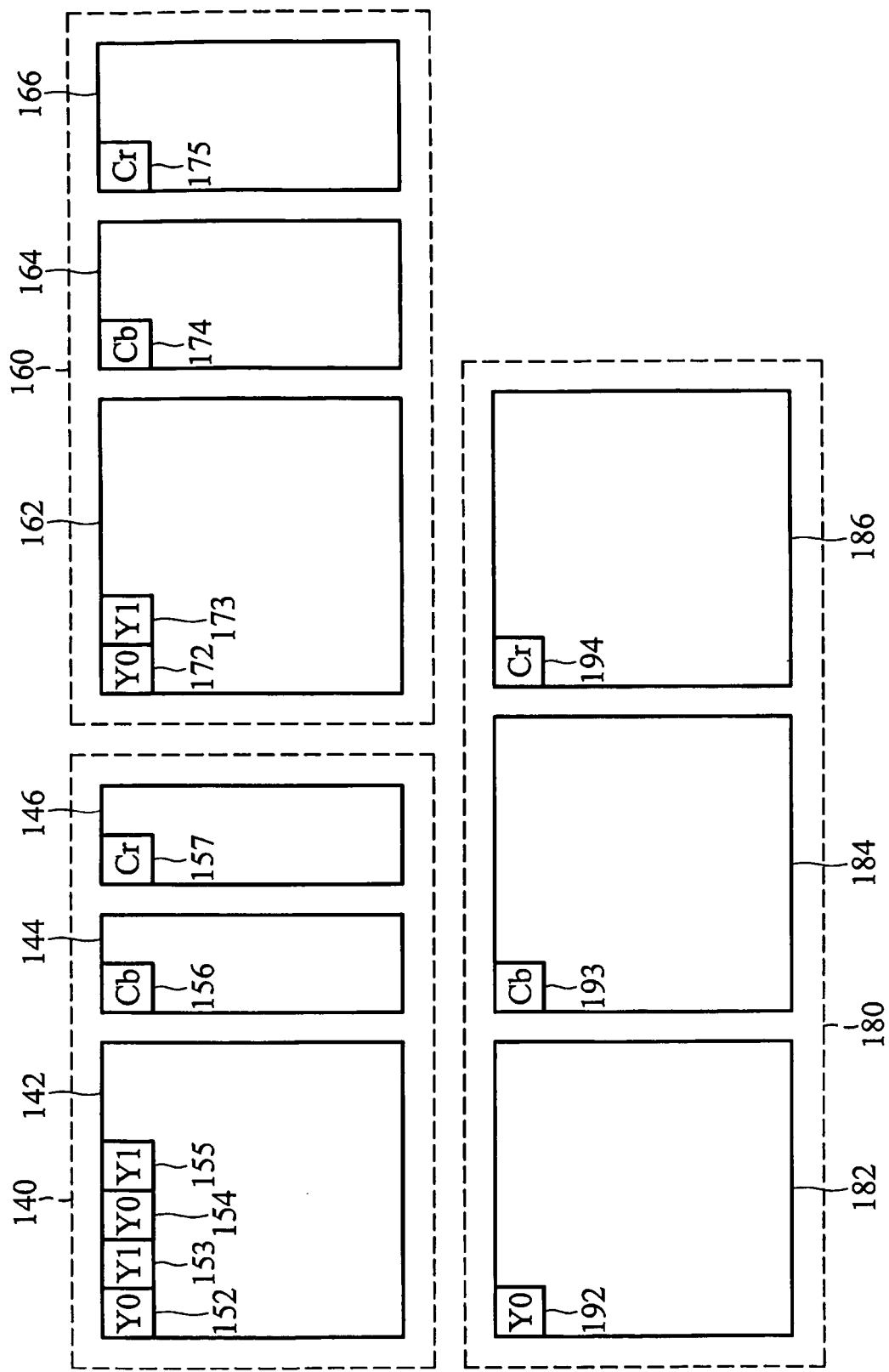
FIG. 1B shows an MCU of JPEG images with 411H, 422H, or 444H format.
Figure 4:
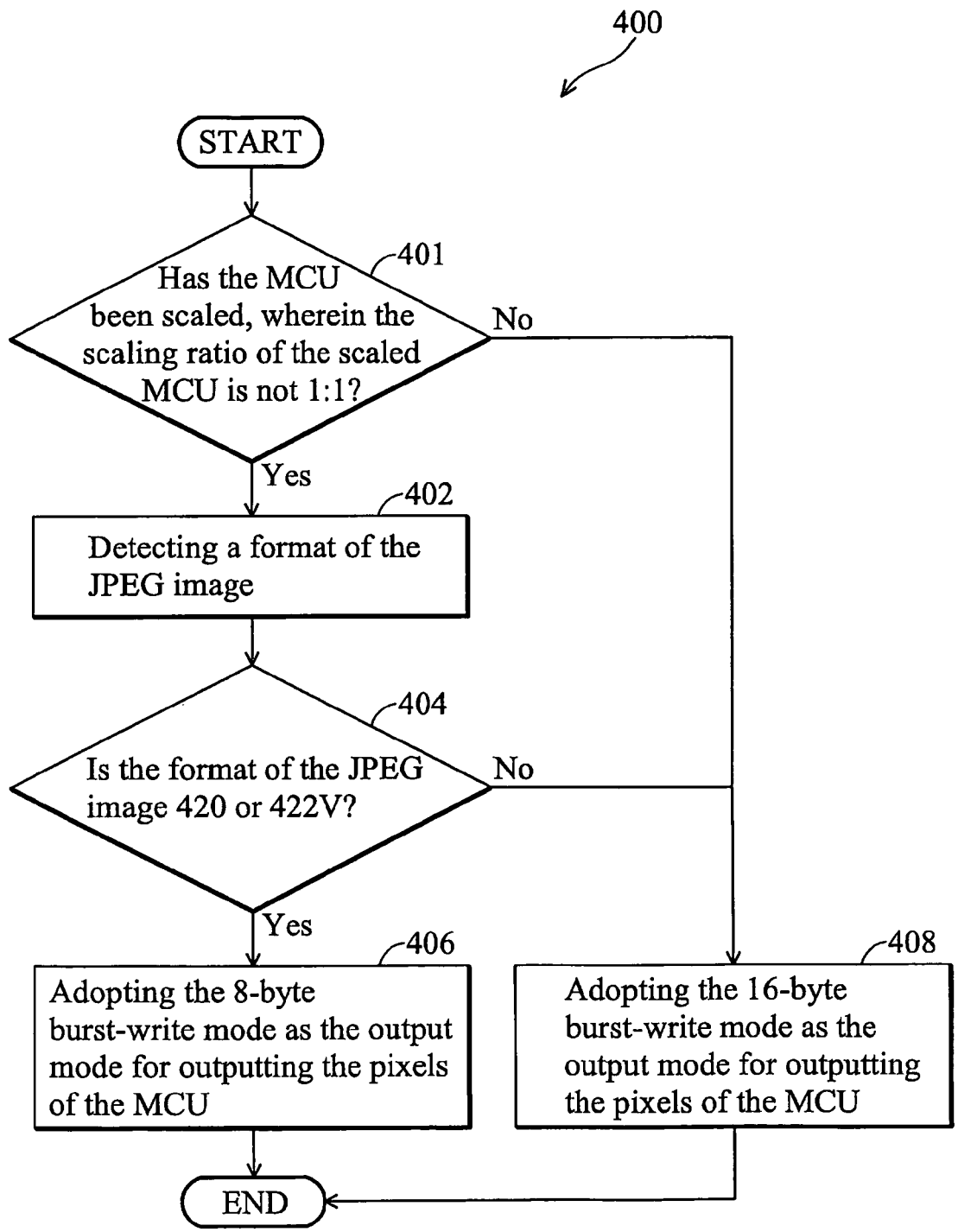
FIG. 4 is a flowchart of a method for determining an output mode according to the invention.

Referring to FIG. 4, a flowchart of a method for determining an output mode according to the invention is shown. The output module 208 determines an output mode according to method 400. First, the output module 208 determines whether the MCU has been scaled and whether the scaling ratio of the scaled MCU is 1:1 (step 401). If the MCU has not been scaled or the scaling ratio of the scaled MCU is 1:1, the 16-byte burst write mode is determined to be the output mode (step 408). If the MCU is a scaled MCU and the scaling ratio of the scaled MCU isn't 1:1, the output mode is determined according to a format of the JPEG image(step 402). If the FIG. 1B JPEG image format is 411, 422H, or 444, the 16-byte burst write mode is determined to be the output mode for outputting intensity pixels from the memory buffer 204 (step 408). If the FIG. 1A JPEG image format is 420 or 422V, the 8-byte burst write mode is determined to be the output mode for outputting intensity pixels from the memory buffer 204 (step 406). In addition, the color pixels of the scaled MCU are output from the memory buffer 204 according to the 8-byte burst write mode regardless of the JPEG image format.

Figure 5:
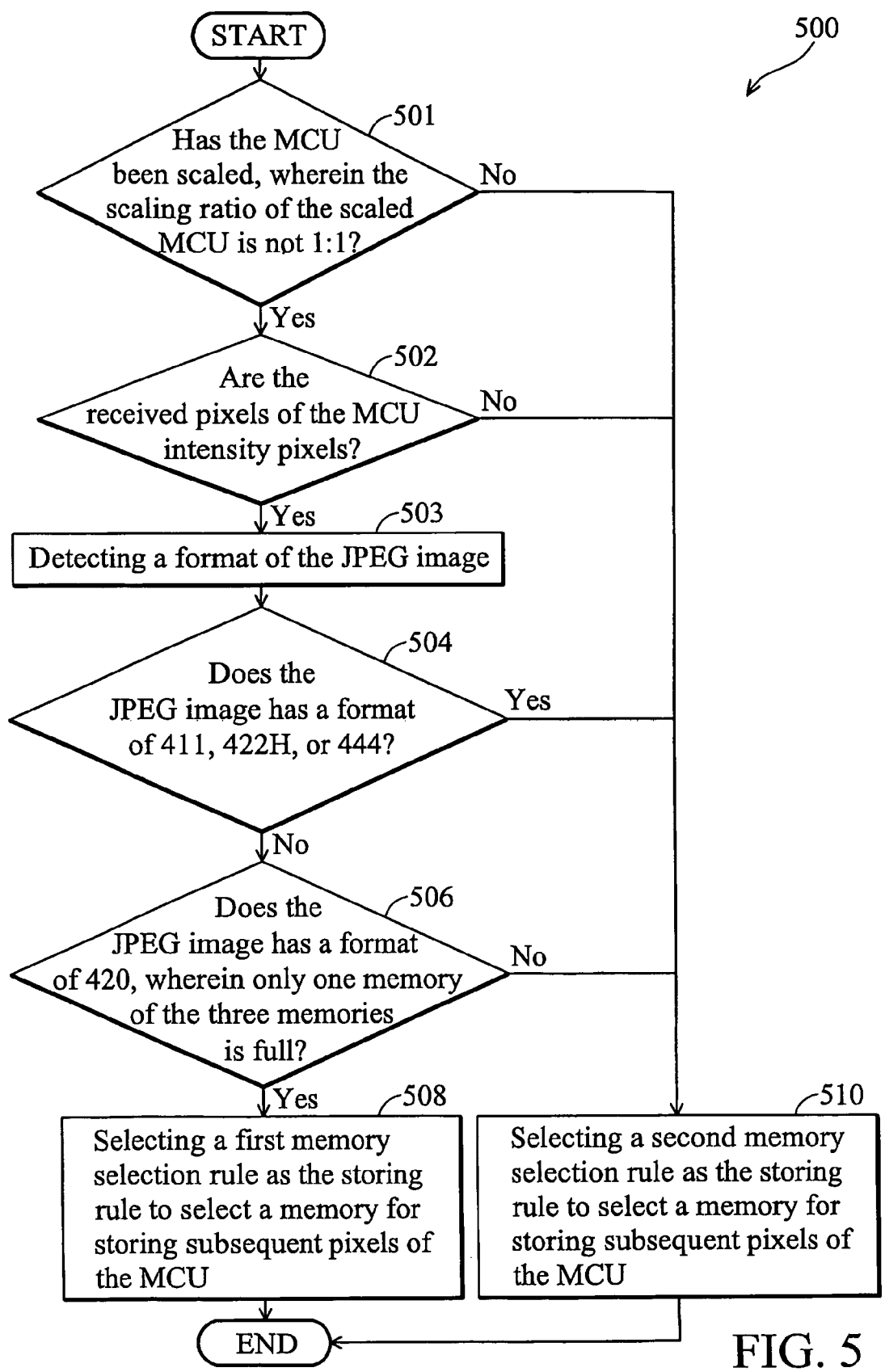
FIG. 5 is a flowchart of a method for selecting a storing rule according to the invention.

Referring to FIG. 5, a flowchart of a method 500 for selecting a storing rule according to the invention is shown. The memory access control module 206 determines the storing rule according to method 500. The storing rule comprises a first memory selection rule and a second memory selection rule. The memory access control module 206 first determines whether the MCU has been scaled and whether the scaling ratio of the scaled MCU is 1:1 (step 501). If the MCU has not been scaled or the scaling ratio of the scaled MCU is 1:1, the second memory selection rule is determined to be the storing rule no matter if current pixels of the MCU are intensity pixels or color pixels (step 510).

When the received MCU has been scaled and the scaling ratio of the scaled MCU isn't 1:1, the memory access control module 206 determines whether the pixels of the scaled MCU are intensity pixels or color pixels(step 502). If the pixels are color pixels, the second memory selection rule is determined to be the storing rule (step 510). If the pixels are intensity pixels, the memory access control module 206 determines the storing rule according to the JPEG image format (step 503). If the format of the JPEG image is 420 or 422V, and only one memory of the three memories of the memory module 204 for storing intensity pixels is full (step 506), the first memory selection rule is determined to be the storing rule (step 508). Otherwise, if the format of the JPEG image is 411, 422H, or 444 (step 504), or two memories of the three memories of the memory module 204 for storing intensity pixels are full (step 506), the second memory selection rule is determined to be the storing rule (step 510).

The memory module 204 comprises a first memory to a sixth memory and each memory can store a pixel block comprising 8×8 pixels. The first memory to the third memory store intensity pixels and the fourth memory to the sixth memory store color pixels. Because an MCU is often scaled before being inputted into the memory module 204, each of the pixel blocks of the scaled MCU comprises only r×c pixels, wherein r and c are natural numbers less than or equal to 8. The byte number of a pixel block of a scaled MCU is therefore reduced and a memory can therefore hold more than one pixel block of a scaled MCU. When a current memory stores a first pixel block with remaining space, the space of the current memory is used to store a portion of pixel data of a subsequent pixel block. The data of the subsequent pixel block are therefore divided into two portions and respectively stored in the current memory and a subsequent memory. The memory module 204 therefore selects the subsequent memory for storing the remnant portion of the subsequent pixel block according to the storing rule.

Referring to FIGS. 6A and 6B, a first memory selection rule 600 and a second memory selection rule 650 are respectively shown. If the first memory selection rule 600 is selected as the storing rule, when a current memory storing a first portion of a pixel block is the first memory, the second memory, or the third memory, the third memory, the first memory, and the second memory are respectively selected as a subsequent memory for storing a second portion of the pixel block. If the second memory selection rule 650 is selected as the storing rule, when a current memory storing a first portion of a pixel block is the first memory, the second memory, or the third memory, the second memory, the third memory, and the first memory are respectively selected as a subsequent memory for storing a second portion of the pixel block. Accordingly, if the pixel block stores color pixels rather than intensity pixels, the first, second, and third memory in FIGS. 6A and 6B are respectively replaced by the fourth, fifth, and sixth memory.

Figure 7A:
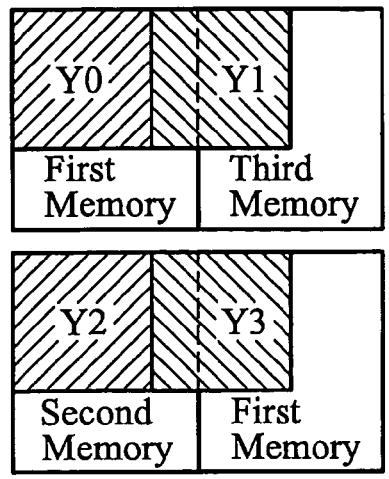
FIG. 7A shows an example of operation of the memory module according to the first memory selection rule.

Referring to FIG. 7A, an example of operation of the memory module 204 according to the first memory selection rule 600 is shown. If the pixel block is intensity pixels of an MCU of a JPEG image with 420 format, as Y0~Y3 of MCU 100 shown in FIG. 1A, the memory access control module 206 determines the first memory selection rule 600 as the storing rule. Because the first memory has leftover space after a pixel block Y0 is stored therein, a first portion of the pixel block Y1 is also stored in the first memory. According to the first memory selection rule 600, the third memory is selected as a next memory for storing a second portion of the pixel block Y1.

Next, because the current memory is the third memory, the second memory is selected as a next memory for storing a pixel block Y2 according to the first memory selection rule 600. A first portion of a subsequent pixel block Y3 is also stored in the second memory. When the first memory is full, data in the first memory is output to the frame buffer, and the first memory is now able to hold new data. The first memory is therefore selected as a next memory for storing a second portion of the pixel block Y3 according to the first memory selection rule 600.

Figure 7B:
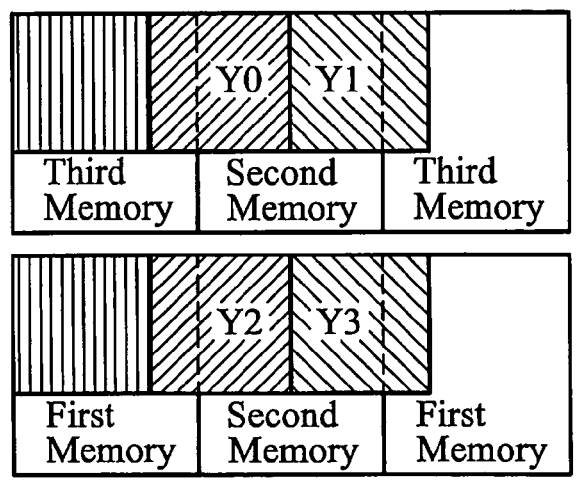
FIG. 7B shows an example of operation of the memory module according to the second memory selection rule.

Referring to FIG. 7B, an example of operation of the memory module 204 according to the second memory selection rule 650 is shown. Assume that the memory module 204 continues to receive the pixel block with intensity pixels of a next MCU of the JPEG image with 420 format. In this scenario, the current memory would be a third memory, and the second memory would be selected as a next memory for storing a first portion of a pixel block Y1 according to the second memory selection rule 650. Because both the third memory and the second memory are full, two of three memories are therefore full, and the storing rule is changed to the second memory selection rule 650 shown in FIG. 6B. Because the third memory is full, the data stored in the third memory is output to the frame buffer, and thus allowing the third memory to store new data. The current memory is the second memory, and the third memory is therefore selected as a next memory for storing a second portion of the pixel block Y1.

Following, because the current memory is now the third memory, the first memory is selected as a next memory for storing a first portion of a pixel block Y2 according to the second memory selection rule 650. Then, the second memory is selected as a next memory for storing a second portion of a pixel block Y2 and a first portion of a pixel block Y3 according to the second memory selection rule 650. Additionally, because the first memory is now cleared, only the second memory of three memories is full, and the storing rule is changed to the first memory selection rule 600 shown in FIG. 6A. The first memory is therefore selected as a next memory for storing a second portion of the pixel block Y3 according to the first memory selection rule 600.

Figure 7C:
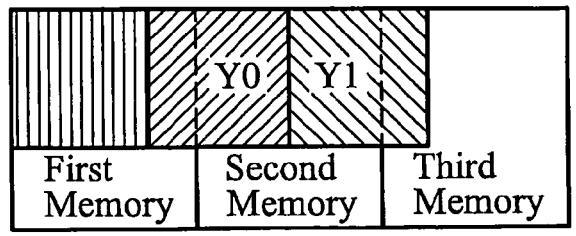
FIG. 7C shows another example of operation of the memory module according to the second memory selection rule.

Referring to FIG. 7C, another example of operation of the memory module 204 according to the second memory selection rule 650 is shown. If the pixel block is intensity pixels of an MCU of a JPEG image with 422H format, as Y0~Y1 of MCU 160 shown in FIG. 1B, the memory access control module 206 determines the second memory selection rule 650 as the storing rule. Assume that the current memory is the first memory. A first portion of the pixel block Y0 is then stored in the first memory. According to the second memory selection rule 650, the second memory is selected as a next memory for storing a second portion of the pixel block Y0. A first portion of the pixel block Y1 is then stored in the second memory. According to the second memory selection rule 650, the third memory is then selected as a next memory for storing a second portion of the pixel block Y1.

The invention provides an apparatus for buffering output pixel data of a JPEG image. Although the apparatus has limited space, the apparatus can still have a high data output rate. Different output modes and storing rules are adopted according to different JPEG image formats. The apparatus can therefore provide high performance with reduced manufacturing cost.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for buffering output pixel data of a Joint Photographic Experts Group (JPEG) image, comprising:
   determining a storing rule for storing a scaled minimum coded unit (MCU) of the JPEG image in a memory module, wherein the scaled MCU comprises a plurality of pixels;
   selecting a memory from the memory module according to the storing rule for storing pixels of the scaled MCU; and
   outputting the pixels of the scaled MCU from the memory module to a frame buffer.

2. The method as claimed in claim 1, wherein the size of the scaled MCU allows the size of the JPEG image to fit the size of the frame buffer.

3. The method as claimed in claim 1, wherein the memory module comprises six memories divided into a first set of memories and a second set of memories, wherein the first set of memories comprises a first memory, a second memory, and a third memory for storing intensity pixels of the scaled MCU, and the second set of memories comprises a fourth memory, a fifth memory, and a sixth memory for storing color pixels of the scaled MCU.

4. The method as claimed in claim 3, wherein the six memories respectively store a pixel block comprising m rows×m columns of pixels, and the scaled MCU comprises a plurality of pixel blocks, wherein each pixel block comprises r rows×c columns of pixels, wherein r, c and m are natural numbers and r and c are less than m.

5. The method as claimed in claim 3, wherein the storing rule comprises a first memory selection rule and a second memory selection rule, when the first memory, the second memory, and the third memory is a current memory storing a first portion of a pixel block, the third memory, the first memory, and the second memory are respectively selected as a next memory storing a second portion of the pixel block according to the first memory selection rule, and the second memory, the third memory, and the first memory are respectively selected as the next memory storing a second portion of the pixel block according to the second memory selection rule.

6. The method as claimed in claim 5, wherein when the fourth memory, the fifth memory, and the sixth memory is a current memory storing a first portion of a pixel block, the sixth memory, the fourth memory, and the fifth memory are respectively selected as a next memory storing a second portion of the pixel block according to the first memory selection rule, and the fifth memory, the sixth memory, and the fourth memory are respectively selected as the next memory storing the second portion of the pixel block according to the second memory selection rule.

7. The method as claimed in claim 5, wherein when pixels input to the memory module are intensity pixels of the scaled MCU, the storing rule is determined according to a format of the JPEG image and the following steps for selecting the next memory storing the second portion of the pixel block if the current memory storing the first portion of the pixel block is full:
when the JPEG image format is 420 or 422V and only one of the first set of memory is full, the next memory is determined according to the first memory selection rule;
when the JPEG image format is 420 and two of the first set of memory is full, the next memory is determined according to the second memory selection rule;
when the JPEG image format is 422H, 444, or 411, the next memory is determined according to the second memory selection rule.

8. The method as claimed in claim 6, wherein the storing rule is determined to be the second memory selection rule for selecting the next memory storing the second portion of the pixel block if the current memory storing the first portion of the pixel lock is full and at least one of the following conditions is satisfied:
the scaling of the scaled MCU is 1:1; and
the pixels of the scaled MCU input to the memory module are color pixels.

9. The method as claimed in claim 1, furthering comprising:
determining an output mode according to a format of the JPEG image, wherein the outputting step is according to the output mode.

10. The method as claimed in claim 9, wherein when the JPEG image format is 420 or 422V, the output mode is determined to be an 8-byte burst-write mode for outputting pixels from the memory module to the frame buffer.

11. The method as claimed in claim 9, wherein the output mode is determined to be a 16-bytes burst-write mode for outputting pixels from the memory module to the frame buffer if at least one of the following conditions is satisfied:
the scaling of the scaled MCU is 1:1;
the JPEG image format is 411;
the JPEG image format is 444; and
the JPEG image format is 422H.

12. An apparatus for buffering output pixel data of a Joint Photographic Experts Group (JPEG) image, comprising:
a memory access control module, receiving a minimum coded unit (MCU) of the JPEG image and determining a storing rule for storing the scaled MCU in a memory module, wherein the scaled MCU comprises a plurality of pixels;
a memory module, coupled to the memory access control module, selecting a memory from the memory module according to the storing rule for storing pixels of the scaled MCU; and
an output module, coupled to the memory module, outputting the pixels of the scaled MCU from the memory module to a frame buffer.

13. The apparatus as claimed in claim 12, wherein the size of the scaled MCU allows the size of the JPEG image to fit the size of the frame buffer.

14. The apparatus as claimed in claim 12, wherein the memory module comprises six memories divided into a first set of memories and a second set of memories, wherein the first set of memories comprises a first memory, a second memory, and a third memory for storing intensity pixels of the scaled MCU, and the second set of memories comprises a fourth memory, a fifth memory, and a sixth memory for storing color pixels of the scaled MCU.

15. The apparatus as claimed in claim 14, wherein the six memories respectively store a pixel block comprising m rows×m columns of pixels, and the scaled MCU comprises a plurality of pixel blocks, wherein each pixel block comprises r rows×c columns of pixels, wherein r, c and m are natural numbers and r and c are less than m.

16. The apparatus as claimed in claim 14, wherein the storing rule comprises a first memory selection rule and a second memory selection rule, when the first memory, the second memory, and the third memory is a current memory storing a first portion of a current pixel block, the third memory, the first memory, and the second memory are respectively selected as a next memory storing a second portion of the current pixel block according to the first memory selection rule, and the second memory, the third memory, and the first memory are respectively selected as the next memory storing a second portion of the current pixel block according to the second memory selection rule.

17. The apparatus as claimed in claim 16, wherein when the fourth memory, the fifth memory, and the sixth memory is a current memory storing a first portion of a pixel block, the sixth memory, the fourth memory, and the fifth memory are respectively selected as a next memory storing a second portion of the pixel block according to the first memory selection rule, and the fifth memory, the sixth memory, and the fourth memory are respectively selected as the next memory storing the second portion of the pixel block according to the second memory selection rule.

18. The apparatus as claimed in claim 16, wherein when pixels input to the memory module are intensity pixels of the scaled MCU, the storing rule is determined according to a format of the JPEG image and the following steps for selecting the next memory storing the second portion of the pixel block if the current memory storing the first portion of the pixel block is full:
when the JPEG image format is 420 or 422V and only one of the first set of memory is full, the next memory is determined according to the first memory selection rule;
when the JPEG image format is 420 and two of the first set of memory is full, the next memory is determined according to the second memory selection rule;
when the JPEG image format is 422H, 444, or 411, the next memory is determined according to the second memory selection rule.

19. The apparatus as claimed in claim 17, wherein the storing rule is determined to be the second memory selection rule for selecting the next memory storing the second portion of the pixel block if the current memory storing the first portion of the pixel block is full and at least one of the following conditions is satisfied:

the scaling of the scaled MCU is 1:1; and the pixels of the scaled MCU input to the memory module are color pixels.

20. The apparatus as claimed in claim 12, wherein the output module is further configured for determining an output mode according to a format of the JPEG image.

21. The apparatus as claimed in claim 12, wherein when the JPEG image format is 420 or 422V, the output module determines the output mode to be an 8-byte burst-write mode for outputting pixels from the memory module to the frame buffer.

22. The apparatus as claimed in claim 20, wherein the output module determines the output mode to be a 16-bytes burst-write mode for outputting pixels from the memory module to the frame buffer if at least one of the following conditions is satisfied:

the scaling of the scaled MCU is 1:1;

the JPEG image format is 411;

the JPEG image format is 444; and the JPEG image format is 422.

\* \* \* \* \*